March 13, 1945. H. LAX 2,371,244
OSCILLOSPHYGMOGRAPH
Filed May 8, 1942 3 Sheets-Sheet 1
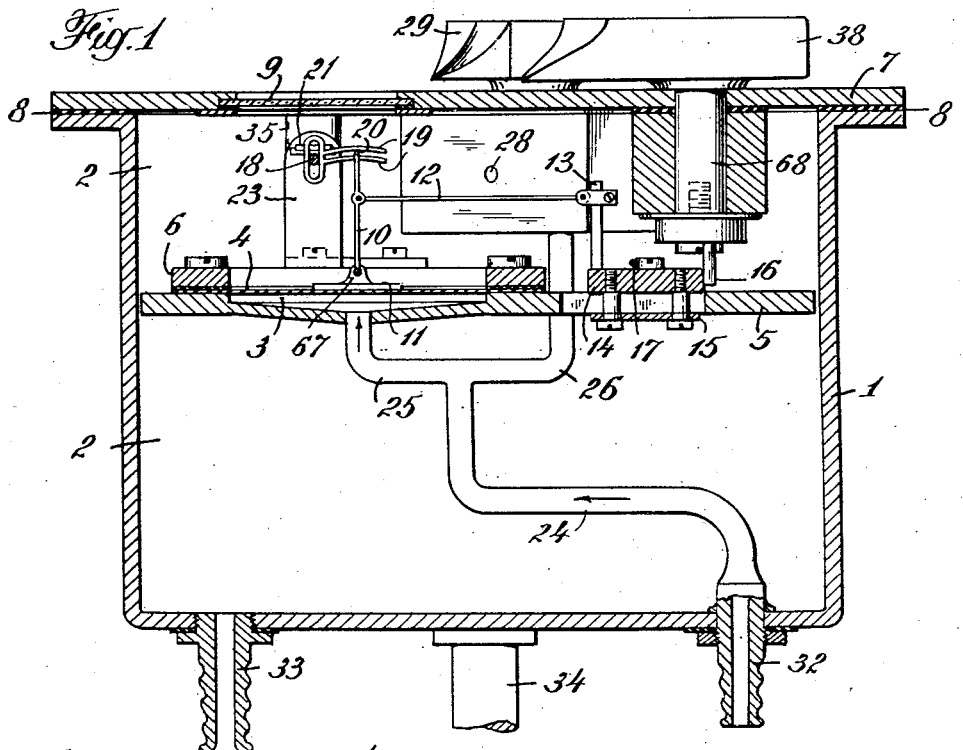
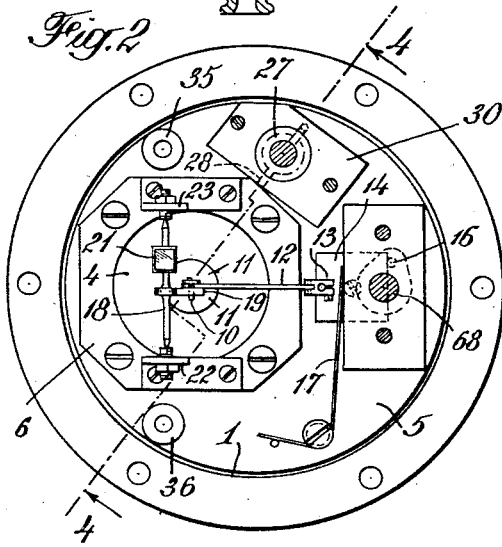
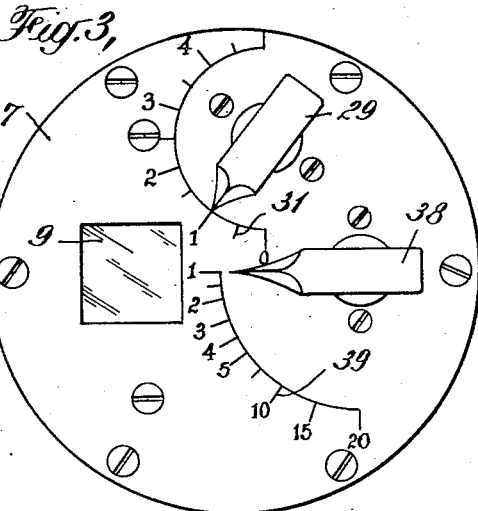
INVENTOR
HENRY LAX
BY
Pennie, Davis, Marvin & Edmonds.
ATTORNEYS March 13, 1945. H. LAX 2,371,244
OSCILLOSPHYGMOGRAPH
Filed May 8, 1942 3 Sheets-Sheet 2
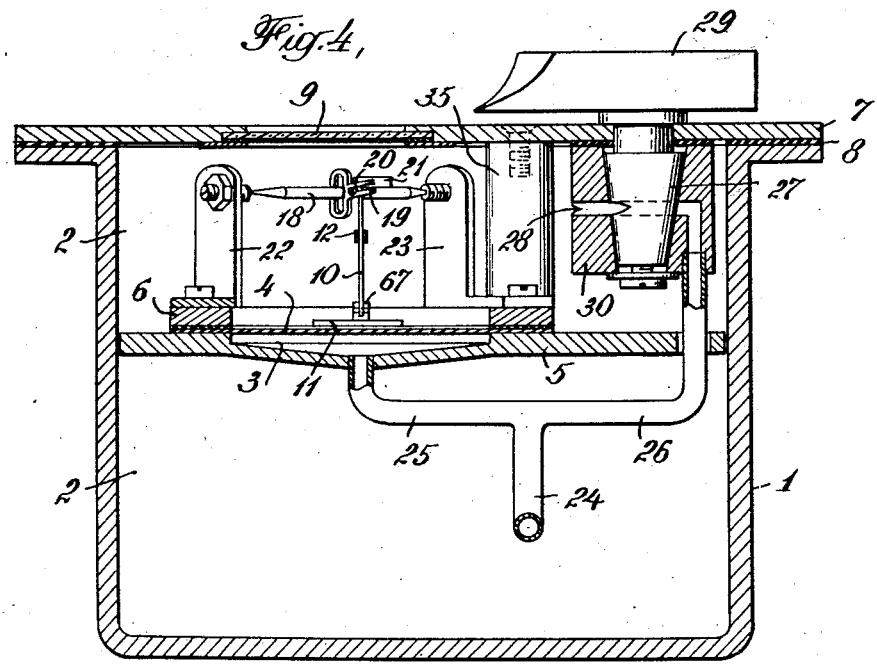
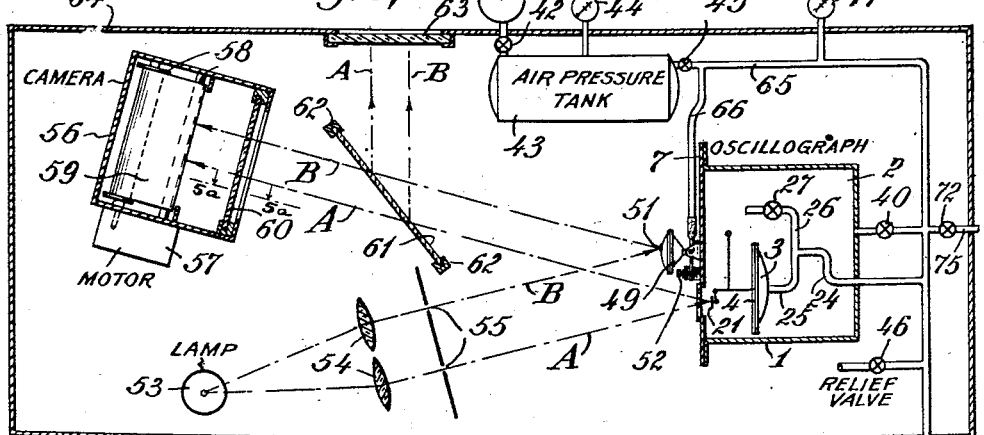
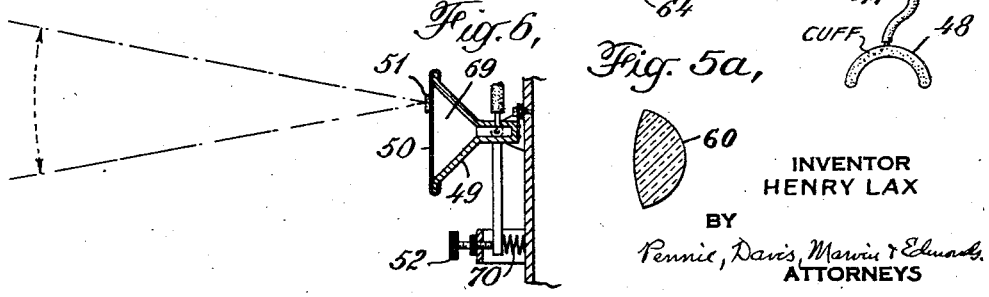
INVENTOR
HENRY LAX
BY
Pennie, Davis, Marvin & Edmonds
ATTORNEYS

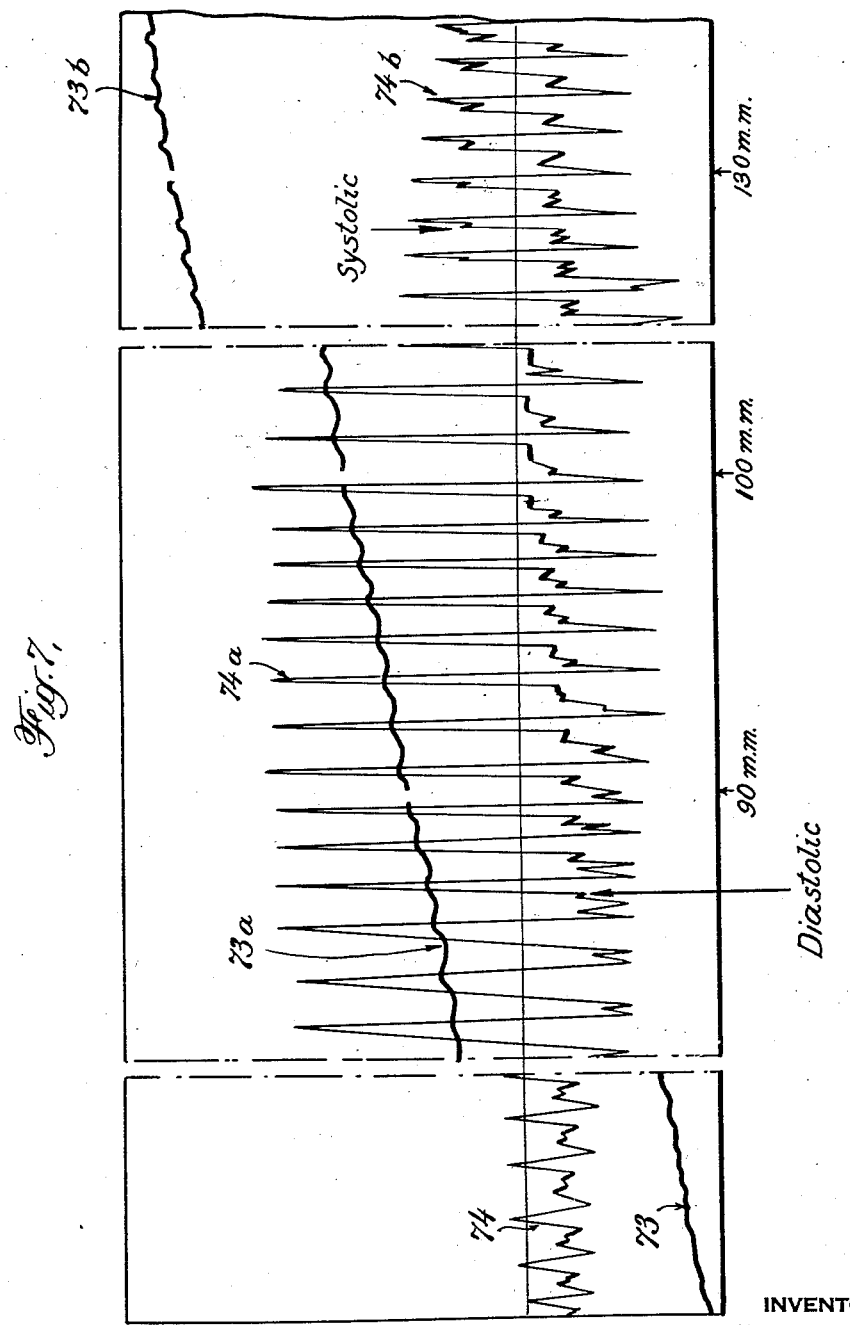

Patented Mar. 13, 1945

2,371,244

UNITED STATES PATENT OFFICE 2,371,244

OSCILLOSPHYGMOGRAPH

Henry Lax, New York, N. Y.

Application May 8, 1942, Serial No. 442,277

20 Claims. (Cl. 128—2.05)

This invention relates to apparatus and methods for indicating and recording conditions and characteristics of the heart and vascular system.

Many different instruments have been devised, and are in use, for measuring and recording blood pressures, pulsations of the blood vessels, cardiac cycles and the like, but they are subject to various limitations and disadvantages which it is the object of the present invention to obviate. Among these limitations are insufficient sensitivity to detect pulsations in the small blood vessels, such as pulsations of the finger or toe arteries, and the inability to register without considerable distortion the relative lengths of the fundamental pulse waves as well as the modulation or fractional waves superimposed on the fundamental pulse waves. Even the more sensitive of the prior apparatus has been incapable of recording the minute modulations, has been limited to certain specific measurements, has not proven sufficiently rugged to be reliable, and the sensitivity has not been adjustable in a useful manner.

By the present invention these as well as other limitations and disadvantages are overcome, and it makes possible with a single apparatus the recording and measurement with great accuracy not only of the pulse characteristics and the manometric, systolic and diastolic pressures, but also the study of the modulations of a single pulse wave in order to detect the differences which are due to early signs of diseases of the arterial walls themselves such, for example, as arteriosclerosis. The fact that the sensitivity of the apparatus can be quickly adjusted within wide limits makes possible the recording of pulsations of the arteries which could not be recorded by previous methods and apparatus. Furthermore, the ability to make such observations and records independently of the subjective judgment of the examiner will at once impress those skilled in the art as being of the highest value.

In accordance with the preferred embodiment of the invention the pulsations, which may be picked up by the usual pneumatic cuff, are caused to actuate a mirror oscillograph having many novel features, the mirror oscillations being photographically recorded. Additional features include means for recording the pulse characteristics in detail during both increase and decrease of pressure in the cuff, and under preselected conditions of cuff pressure and relative sensitivity of the oscillograph.

For a more complete understanding of the invention reference is made to the drawings, wherein:

Fig. 1 is a view in vertical section of the oscilloscope apparatus of my invention;

Fig. 2 is a top view of the oscilloscope of Fig. 1 with the cover removed;

Fig. 3 is a top view of the oscillograph with the cover in place;

Fig. 4 is a vertical sectional view partly in perspective taken along the line 4—4 of Fig. 2;

Fig. 5 is a top view of the oscillosphygmograph according to my invention showing schematically the principal components thereof in simplified form;

Fig. 5a is a sectional view taken along line 5a—5a of Fig. 5;

Fig. 6 is an enlarged view partly in section of one oscillograph component represented in Fig. 5; and Fig. 7 is a reproduction of sections of a typical recording made with the apparatus of the invention.

The complete apparatus according to the invention includes, basically, a light source, oscillographic apparatus, and a recording camera, the novel features and advantages of which will be apparent upon a detailed consideration of the several components and of the relation thereof in combination.

Oscillograph

The oscillograph of my invention is illustrated in Figs. 1-4, inclusive, wherein, as in the remaining figures, like reference characters designate the same parts. Referring first to these figures, the oscillograph is shown to be enclosed in a case 1 having a cover-plate 7. Suspended from the underside of the cover-plate 7 by supporting pillars 35 (Figs. 2 and 4), is a metal base-plate 5 to which are attached the component parts of the oscillograph. The length of the supporting pillars 35 is such as to space the plate 5 away from cover-plate 7 a distance sufficient to accommodate the component parts.

The base-plate 5 is provided with a cavity 3 so that when a sensitive membrane or diaphragm of suitable material such as thin rubber, metal or treated fabric, is stretched across the top thereof this cavity forms a small chamber behind the diaphragm. As shown, this diaphragm is held in stretched condition by a clamping ring 6 beneath which, if necessary, a suitable washer may be inserted, and the ring secured tightly to plate 5 by suitable screws as shown. A cover gasket 8 of soft rubber, and other similar gaskets or washers inserted at all points where there are openings through the cover-plate or through the case 1, results in the formation within the case 1 of a large air-tight chamber 2.

The small chamber 3 is connected with the apparatus external of the oscillator proper through a branch pipe 25 and feed pipe 24 which in turn passes through the case 1 by way of nipple 32 (Fig. 1). The large chamber 2 is connected with the remainder of the apparatus by means of a second nipple 33. A supporting post 34 is shown attached to the underside of case 1 and may be employed to support the oscillograph in its operating position, preferably within a larger cabinet 64, as shown in Fig. 5.

An important feature of the present invention, the significance of which will be described in connection with the operation of the apparatus, resides in the interconnection of the small and large chambers, with a valve for controlling the degree of interconnection or leakage. To this end the branch pipe 25 to the small chamber connects with branch pipe 26 (Fig. 4) ending in orifice 28 which communicates with the large chamber. Between this orifice and branch pipe 26 is inserted a valve 27, which is arranged to rotate in valve seat 30. The valve and valve seat are so formed that rotation of the valve by means of adjusting knob 29 on the outside of cover-plate 7 results in a very accurately controllable rate of air leakage between the small and large chambers, being minutely adjustable from a considerable leakage rate to complete sealing between the two chambers. A suitable scale 31 engraved on the top of cover-plate 7, as is shown in Fig. 3, is arranged to cooperate with an index movable with the adjusting knob 29. This knob and scale may be located elsewhere on the apparatus if desired.

Referring especially to Figs. 1, 2 and 4, there is shown at the center of diaphragm 4 a button 11, preferably constructed of light-weight material and suitably cemented to the diaphragm. Upstanding from the center of this button 11 is a slotted lug 67 in which is hinged by a suitable pin, the lower end of a connecting rod 10. This rod should be of light but stiff material. Spanning the upper side of diaphragm 4 is an axle 18 preferably having hardened pointed ends supported by suitable low-friction bearings which are secured, respectively, in axle supports 22, 23. Suitably secured along this axle is a slotted arm 19. The upper end 20 of connecting rod 10 is formed to slide within the slot of arm 19 and thus to vary the effective length of this arm with respect to the axle 18. At an intermediate point along connecting rod 10 one end of a link 12 is hinged (Fig. 1), the other end being hinged to a post 13. This post extends upwardly from a slide block 14 which is arranged to slide on the upper surface of base-plate 5. Directly beneath the upper slide block 14 is a lower slide block 15 arranged to slide on the underside of base-plate 5. These two slide blocks may be secured together by suitable screws as shown, these screws passing through a slot in the base-plate to allow both blocks to slide a short distance toward and away from the connecting rod 10. It will thus be seen that such sliding motion of the slide blocks causes the link 12 to swing connecting rod 10 from its hinged point 67 and thus to adjust the effective length of arm 19.

The position of the slide blocks 14, 15 is adjusted by means of an eccentric pin 16 (Figs. 1 and 2) which presses on the end of slide block 14 against the pressure of spring 17. Pin 16 is swung by rotation of shaft 68 which is attached to adjusting knob 38. As can be seen in Fig. 3, knob 38 carries a pointer or index which cooperates with a scale 39 engraved on the top of cover-plate 7. If desired knob 38 and scale 39 may be located elsewhere on the apparatus in a position available to the operator. It is important that the graduations of scale 39 be calibrated to indicate a linear relation between the degree of flexure of diaphragm 4 and the deflection of mirror 21. Thus the sensitivity of the oscillograph will be linear, so that, for example, when the index is set at graduation marked "5" the sensitivity is five times that at the graduation marked "1." The importance of this feature and the manner of its use will be described in connection with the operation of the apparatus.

Attached to the top of shaft 18 is a small mirror 21 which is positioned beneath a window 9 in the cover-plate. Thus it will be seen that when a fine beam of light is caused to shine through the window 9 upon the mirror 21, the beam will be reflected by the mirror back through the window and the reflected beam will be caused to swing depending upon the degree of rotation of axle 18. Thus for a given vertical movement of diaphragm 4 due to an increase of air pressure in chamber 3, an equal longitudinal movement of connecting rod 10 will result, and the consequent rotation of axle 18 and resulting deflection of the reflected light beam from the mirror will depend upon the effective length of arm 19 which in turn depends upon the sensitivity adjustment of knob 38. The mechanism just described can be constructed for a very reasonable cost after the manner employed by fine instrument makers and clock makers, and so as to introduce very little friction by moving parts. This construction results in an oscillograph of great sensitivity and yet sufficiently rugged to be satisfactory in portable instruments.

*Oscillosphygmograph*

The complete oscillosphygmograph apparatus in accordance with the present invention is illustrated schematically in Fig. 5. The arrangement of the components shown in this illustration has been chosen merely for clarity of illusration because in the actual apparatus the physical arrangement would usually be different for convenience in operation and for compactness.

In Fig. 5 a suitable light source or lamp 52 is shown to be located so as to project light through two parallel condensing lenses 54. This lamp may be arranged to be energized by a current source external to the enclosing cabinet 64, or for portability the lamp may be energized by a battery contained within the cabinet. On the side of the lens 54 away from the lamp 53 is a light gate which may comprise a thin sheet of metal provided with two small holes 55 from which two narrow beams of light A and B are projected toward the oscillograph 1. It is assumed that this oscillograph is constructed in accordance with the present invention particularly as above described. One of these light beams, A, is reflected from the mirror 21 of the oscillograph as already explained, and the other light beam, B, is reflected from another mirror 51 secured to the diaphragm 50 of a recording capsule. The construction of this type of capsule, which is well known in the art, is shown in more detail in Fig. 6, and comprises a hollow body 49 of generally conical shape closed by a flexible membrane or diaphragm 50 forming an internal chamber 69. It is preferable that this diaphragm be thick enough to be not as sensitive as diaphragm 4. On the diaphragm 50 away from the center is secured a small mirror 51 which is caused to oscillate by movement of the diaphragm resulting from change of pressure in chamber 69. The initial angle of mirror 51 may be adjusted by means of adjusting screw 52, movement of which against the pressure of spring 70 causes the entire capsule to be tilted slightly in one direction or the other, as required. Although this capsule is represented in Fig. 5 to be adjustably secured to the cover-plate 7 of oscillograph 1 it may, of course, be secured in any suitable location in cabinet 64.

After reflection from mirrors 21 and 51, respectively, the light beams A and B pass into a recording camera. This camera may be constructed in accordance with such devices well known in the art, but briefly it comprises a light-tight box 56 which encloses two rollers 58, one carrying a rolled strip of unexposed photosensitive paper 59, and the other of which receives the paper after exposure. A suitable motor 57 which may be driven by clockwork, or by electricity, is included to rotate either one or both of the rollers 58. Behind a suitable window provided in the front of the camera through which the beams of light A and B pass, is a cylindrical type lens 60 which, as shown, extends the entire length of the window. Fig. 5a is a cross-sectional view of lens 60. This lens focuses any light beam impinging thereon into a very fine point on the surface of the photosensitive paper within the camera, and by motion of this point of light with respect to motion of the paper lines are traced on the paper 59 in accordance with the oscillations of mirrors 21 and 51. Typical recordings of this apparatus are represented in Fig. 7.

Especially for convenience in adjusting the apparatus, a mirror 61 is provided and is arranged to slide in guides 62 so that it may be positioned to intercept the light beams A and B and reflect them on a ground-glass screen 63 in the side of cabinet 64. Suitable mechanism operable externally of cabinet 64 should be provided to move this mirror. Thus preliminary adjustments may be made before the recording is commenced so that the operator may be certain that the record will be satisfactory. Alternatively, the mirror may be arranged to swing quickly in and out of the light beams in response to movement of a lever or button on the outside of the cabinet. Such an arrangement has been found useful also when it is desired to interrupt one or more of the light beams periodically to indicate time periods or arbitrary pressures on the record as shown on curve 73, Fig. 7. If the brilliancy of the light source is sufficient, mirror 61 may be of the translucent variety, or may be an opaque mirror having a large number of fine lines scratched in the surface of the reflecting film so that the mirror may be left in place for simultaneous recording and continuous observation of the light fluctuations being recorded. Another arrangement employed in other types of oscillographs is especially convenient in the present apparatus, and comprises the placing of a suitable mirror in such position as to reflect a "slice" or section of the reflected light beams constantly on to the screen 63, so that the operator may watch a visual reproduction of the waves while they are being recorded, the beams A and B being normally wider than required for recording purposes.

In addition to the foregoing components, the apparatus of Fig. 5 includes an air pressure tank 43, an air pump 41, an air pressure gauge 44 connected to the tank 43 to indicate the air pressure therein, and suitable pipe lines connecting the pump, the oscillograph, the capsule, and the cuff 48, which is represented to be attached to the permanent piping by means of flexible tubing 47. A manometer 71 connected to the lines to the capsule and to the cuff will provide a continuous indication of the pressures therein. Cuff 48 may be of the type ordinarily employed in connection with sphygmomanometers for application around the arm, for example. Although only one cuff is illustrated, two cuffs may be employed, one, 48, being connected as shown, and the other to pipe 75, with an interconnecting pipe including a valve 72 between them. Furthermore, because of the unusual sensitivity of the apparatus according to this invention, a cuff of very small size suitable for application to a finger or toe, for example, may be used. In addition, control valves located at suitable points should be included for the purposes presently to be explained in connection with the operation of the apparatus.

*Operation*

The operation of the apparatus and operation technique are as follows: Assuming that cuff 48 is in suitable position on the patient to record the desired characteristics and conditions, air pressure valve 45 is closed, pump valve 42 is opened and air is pumped into the tank 43 until gauge 44 indicates, say, two or three atmospheres pressure. This provides a non-pulsating air supply under pressure, making possible recordings during increase of pressure in the cuff.

Valves 40, 42 and 46 are next closed and valves 45 and 27 slightly opened allowing air to flow slowly into cuff 48 and likewise into both the small and large chambers of the oscillograph. By opening valve 27 slightly the leakage between the chambers tends to compensate or to equalize the steadily changing or unfluctuating pressure on both sides of diaphragm 4 without substantially affecting the response to the rapid fluctuations to be indicated. This increases the sensitivity by preventing "bias" distortion of the diaphragm. Manometer 71 registers the pressure in the cuff and also to some extent indicates the pulsations of the blood as soon as the pressure in the cuff has become sufficient. At this point in the method, the pulses in the pneumatic system will be sufficient to actuate the diaphragm 4 so as to cause mirror 21 to oscillate. Valve 45 may then be temporarily closed while the oscillations of the mirror 21 are observed on ground glass screen 63 by reflection from mirror 61. Also a reflection from mirror 51 of capsule 49 will be observed. Adjustments of screw 52 and of knobs 38 and 29 may be made if required, after which relief valve 46 may be opened, to allow the escape of air from the system and then closed.

Motor 57 may now be started causing the photosensitive paper 59 to pass beneath lens 60 of the camera at a suitable rate for which an adjustment should be provided in a manner known in the art. Mirror 61 may be moved out of the line of light rays A and B and valve 45 opened a small degree to allow air again to flow into the pneumatic system including cuff 48. A record will now be made while the air pressure is increasing in cuff 48. The resulting record will, in general, appear like that shown in Fig. 7 wherein the curve 73 is the manometric or actual blood pressure curve which is a function of the pressure in capsule 49, and the pulse curve 74 is a function of the pressure within the small chamber 3. The amount of detail reproduced in the pulse curve 74 can be made greater or less, depending upon the requirements of the case, by adjustment of the sensitivity of the oscillograph by means of knob 38.

If under certain conditions, as in the case of unusually high blood pressure, the minimum sensitivity obtainable by adjustment of knob 38 is still too great for satisfactory recording, further reduction in sensitivity may be secured by further opening valve 27 by adjustment of knob 29. Both adjustments may be made very rapidly, which is of considerable advantage if changes in sensitivity are to be made during recording. From the foregoing it will be apparent that knobs 38 and 29 adjust the sensitivity of the instrument by different means, and that they usually are employed under different conditions.

The width of the recorded pulse waves can, of course, be varied by control of the speed of motor 57, and extremely minute modulations or fractional waves superimposed on the fundamental waves become more apparent if the speed is increased. From these waves the diastolic pressure can be determined, the fractional waves representing, among other things, the peripheral resistance or elasticity of the blood vessel walls. Indications thereof to the degree of accuracy made possible by the present invention are of great value in diagnosis.

As the air pressure increases in the cuff the deflections of the oscillograph mirrors likewise increase until a pressure is reached sufficient to stop the circulation in the blood vessels beneath the cuff, at which point the systolic blood pressure is indicated by signs or characteristics on the recorded curves which will be pointed out in connection with Fig. 7. The operator of the apparatus will be able to recognize the fact that the circulation has been cut off by feeling of the pulse or by glancing at screen 63 during a momentary interruption of the light beams by mirror 61. If this is the only record desired, the motor may be stopped, valve 45 closed and valve 46 opened.

If, as is frequently the case, it is desired to make a record during decrease of the pressure in the cuff, valve 45 may be closed and relief valve 46 opened only an amount allowing the air in the pneumatic system gradually to leak off. At the same time the valve 40 may be opened to allow simultaneous leakage from both chambers, because the leakage through valve 27 would probably not be fast enough to maintain the decreasing pressure the same on both sides of the diaphragm 4. The record made during decrease of pressure will, in general, be similar to that of Fig. 7, except that the pulse curves will appear in reverse sequence and the slope of curve 73 will be reversed. When the pressure in the pneumatic system has decreased to that of the atmosphere, as shown by manometer 71, the recording process will have been completed and the recording motor should be stopped. The taking of an entire record as above described requires approximately from three to four minutes. If the record desired is to be made during only increase of pressure or only during decrease of pressure the recording time will, of course, be approximately half of that described. However, under certain conditions it is desirable to have available the entire record so that the pulse waves at corresponding pressure during increase and during decrease may be compared.

As a rule recordings made during increase of cuff pressure are more reliable and revealing than those made during decrease of pressure because in the former case the record is made under normal conditions of the blood vessels and while the patient feels no discomfort. This method contrasts with the prevailing practice which commences with an initial cuff pressure far above the systolic pressure, causing pain and abnormal reaction of the blood vessels below the cuff. Measurements and recordings made under the latter conditions being, therefore, not strictly reliable, I prefer to take recordings during increase of pressure.

Under certain conditions it is desirable to make a record while the pressure in the cuff is maintained constant, in which event valves 40, 46 and 27 are closed, and valve 45 is closed after the desired cuff pressure has been reached. In this case all pulsations from the cuff are caused to actuate the diaphragm, with the result that very minute modulations of the pulse waves will be recorded.

As previously indicated, the sensitivity of the oscillograph of this invention is so great that records of pulsations may be made at parts of the body, such as the feet and toes, where heretofore such measurements could not be made at all. For this purpose the sensitivity of the oscillograph should be adjusted by knob 38 to be near its maximum, and valve 27 closed, after which the process of making the record would be substantially as above described. By such measurements, especially of the toes, many blood vessel diseases and disorders may be detected in their early stages, whereas these conditions would not be manifested at all by apparatus heretofore available.

The variable sensitivity control 38 of the present invention provides another great advantage in that it makes possible the comparison of the pulsations in diseased areas with those in sound areas with considerable quantitative accuracy. Such comparison may be made merely by noting (on scale 39) the sensitivity required in diseased areas to obtain recordings of wave lengths equal to those obtained in sound areas. Such comparisons may be made directly by measurement of the recorded chart, or on screen 63, especially if it be provided with calibration lines, because the sensitivity control, as previously explained, is calibrated linearly. Another important use of the variable sensitivity control resides in making comparative records at a given location on the body, both before and after administering an indicated therapy. Thus by making successive records under the same standardized conditions it is possible by means of the present invention to determine quantitatively the extent to which the intervening treatment has been successful.

Referring now to the reproduction of the typical record shown in Fig. 7, it will be seen that the record is divided into three sections. The original record from which Fig. 7 was reproduced was several feet long, but for convenience in reproduction only three sections of the record have been shown. It will, therefore, be understood that the sections of curves indicated by reference characters 73, 73a, 73b, and 74, 74a, 74b were originally two unbroken curves.

The section of the record reproduced at the left of Fig. 7 shows a lower curve 73 as traced by beam B reflected from the capsule mirror 51, and an upper curve 74 as traced by beam A reflected from the oscillograph mirror 21. Curve 73 represents the actual or manometric pressure in the cuff, and in this left-hand section indicates the pressure to be increasing slowly from a low value. Hence, in the recording 74, the pulsations are of small amplitude, although even here modulations recorded in each pulse wave are strong and distinct.

In the center section the pressure curve 73a has risen considerably, the actual pressure range there represented having been from about 85 to about 105 mm. of mercury. The two interruptions in curve 73a, were made at the time of recording by interrupting the light beam when the operator observed the meter 71 to register 90 and 100 mm., respectively. In this section the cuff pressure was great enough to allow recording of the modulations of the pulse waves 74a in great detail. The modulation marked "Diastolic" is the point on curve 74a at which the diastolic blood pressure was recorded, and in this case was at 87 mm.

The right-hand section shows the pressure curve 73b in the neighborhood of 130 mm., and indicates decreased amplitude of the pulse waves due to impedance of the circulation. The modulation marked "Systolic" is the point on curve 74b at which the systolic blood pressure was recorded, and in this case was at 128 mm.

It will be noted that in the right-hand section the pressure curve 73b is approaching the upper edge of the recording paper at about 135 mm. pressure. In the event that pulsations at still higher pressures are to be recorded, the adjusting screw 52 may be turned so that beam B starts over again at the lower edge of the paper and the recording may then continue. In this event the pressure calibrations or indications will continue to be correct because the capsule is designed to provide a linear relation between deflection of the mirror 51 and change of applied pressure within the limits of possible blood pressures.

If it be desired to read the actual pressures directly from the recording paper without interrupting the light beam B, the width of the paper may be ruled in longitudinal lines spaced, say 2 millimeters apart (depending upon the type of diaphragm used) and the instrument calibrated in advance, so that a deflection of a certain number of millimeters from a base line represents a certain pressure change.

It is to be understood that the oscillograph according to this invention and the several novel features thereof are not limited to uses in connection with medical or physiological apparatus, but are generally applicable wherever unusually reliable, sensitive oscillographic apparatus of readily adjustable sensitivity is desired. The invention herein described has been represented as being operated by air pressure and by air pulses within the apparatus, but those skilled in the art will appreciate that the apparatus could readily be adapted for operation by any suitable fluid other than air or other gases. Hence the term "pneumatic" as employed herein should be construed broadly to include fluids which might commonly be included in the term "hydraulic."

What is claimed is:

1. In a pneumatically operated oscillograph, a small chamber sealed by a sensitive diaphragm, indicating means actuated by flexure of said diaphragm, a large airtight chamber containing said small chamber, a pneumatic conduit adapted to connect said small chamber to a source of minute pressure fluctuations to be indicated by said oscillograph, a source of controllable changing pressure connected to said conduit and thereby to said small chamber, and means for compensating the effect of said changing pressure on said diaphragm comprising a pneumatic conduit interconnecting said chambers and a valve in said last named conduit for controlling the degree of interconnection between said chambers.

2. In a pneumatically operated oscillograph for indicating minute fluctuations in pressure, a case, a base plate, means supporting said base plate within said case, a cavity in said base plate, a sensitive diaphragm stretched across said cavity to form a small airtight chamber, an airtight closure for said case forming a large sealed chamber therein, a pneumatic conduit adapted to connect said small chamber to a source of minute pressure fluctuations to be indicated by said oscillograph, a source of controllable changing pressure connected to said conduit and thereby to said small chamber, and means for compensating the effect of said changing pressure on said diaphragm comprising a pneumatic conduit interconnecting said chambers and a manually operable valve in said last named conduit for controlling the degree of interconnection between said chambers and thereby the degree of compensation.

3. In a pneumatically operated oscillograph, a case, a base plate, means supporting said base plate within said case, said base plate having a cavity formed therein, a movable diaphragm stretched across said cavity to form a small airtight chamber, a movable mirror effectively supported from said base plate, means operatively linking said mirror to said diaphragm, and means manually adjustable externally of said case to determine the degree of movement of said mirror with respect to the degree of movement of said diaphragm.

4. In a pneumatically operated oscillograph, a case, a base plate, means supporting said plate within said case, a small sealed chamber supported by said plate, a flexible diaphragm comprising one side of said small chamber, an airtight closure for said case forming a large sealed chamber therein, a movable mirror effectively supported from said plate, a window in said case positioned to transmit a light beam reflected from said mirror, means operatively linking said mirror and said diaphragm, means operable externally of said case to adjust the degree of movement of said mirror with respect to the degree of movement of said diaphragm, a pneumatic conduit interconnecting said chambers, a valve in said conduit operable externally of said large chamber for controlling the degree of interconnection between said chambers, and a pneumatic connection to said small and large chambers.

5. In a pneumatically operated oscillograph, a case, a base plate, means supporting said plate within said case, a small sealed chamber supported by said plate, a thin flexible diaphragm comprising one side of said small chamber, an airtight closure for said case forming a large sealed chamber therein, a pneumatic conduit adapted to connect said small chamber to a source of minute pressure fluctuations to be indicated by said oscillograph, a source of controllable changing pressure connected to said conduit and thereby to said small chamber, and means for compensating the effect of said changing pressure on said diaphragm comprising a pneumatic conduit interconnecting said chambers and a valve in said last named conduit manually operable externally of said large chamber for controlling the degree of interconnection between said chambers.

6. In a pneumatically operated oscillograph, a sealed case constituting a large chamber, a small sealed chamber within said large chamber, a thin flexible diaphragm constituting a wall of said small chamber, a hinged joint secured to said diaphragm, a connecting rod secured at one end to said hinged joint, an axle supported substantially parallel to said diaphragm and spaced away therefrom, a mirror arranged to rotate with said axle, an arm fixed at one end to said axle and extending substantially at right angles therefrom, means slidably connecting the other end of said connecting rod with said arm, sensitivity-adjusting means controllable externally of said case, coupled to said connecting rod and operable to slide said rod along said arm, whereby to vary the effective length of said arm, and a pneumatic connection to said large and small chambers.

7. In a pneumatically operated oscillograph, a case, a sealed chamber within said case, a thin flexible diaphragm constituting a wall of said chamber, a hinged joint secured to said diaphragm, a connecting rod secured at one end to said hinged joint, an axle supported substantially parallel to said diaphragm and spaced away therefrom, a mirror arranged to rotate with said axle, an arm secured at one end to said axle and extending therefrom, means slidably connecting the other end of said connecting rod with said arm, sensitivity-adjusting means controllable externally of said case, coupled to said connecting rod and operable to slide said rod along said arm, whereby to vary the effective length of said arm, and a pneumatic connection through said case to said chamber.

8. In a pneumatically operated oscillograph, a sealed case constituting a large chamber, a small sealed chamber within said large chamber, a thin flexible diaphragm constituting a wall of said small chamber, a hinged joint secured to said diaphragm, a connecting rod secured at one end to said hinged joint, an axle supported substantially parallel to said diaphragm and spaced away therefrom, a transparent window in said case, a mirror secured to said axle and positioned to reflect a light beam through said window, an arm fixed at one end to said axle and extending substantially at right angles therefrom, means slidably connecting the other end of said connecting rod to said arm, sensitivity-adjusting means controllable externally of said case, coupled to said connecting rod and operable to slide said rod along said arm whereby to vary the effective length of said arm, and a pneumatic connection to said large and small chambers.

9. In a pneumatically operated oscillograph, a sealed case comprising a large chamber, a small sealed chamber within said large chamber, a thin flexible diaphragm constituting a wall of said small chamber, a connecting rod hinged at one end to said diaphragm, an axle supported in low-friction bearings substantially parallel to said diaphragm and spaced away therefrom approximately the length of said connecting rod, a transparent window in said case, a mirror secured to said axle and positioned to reflect a light beam through said window, an arm fixed at one end to said axle and extending substantially at right angles therefrom, a slidable connection between said arm and the other end of said connecting rod, means operable externally of said case and coupled to said connecting rod to slide said rod along said arm, whereby to adjust the effective length of said arm, a pneumatic conduit interconnecting said chambers, a valve in said conduit operable externally of said case for controlling the degree of interconnection between said chambers, and a pneumatic connection to said large and small chambers.

10. The combination according to claim 7 in which said sensitivity-adjusting means comprises a manually adjustable knob external of said case, and an index and a scale cooperating therewith, one of which is movable with said knob, said scale being calibrated linearly with respect to the deflection of said mirror.

11. The combination according to claim 8 in which said sensitivity-adjusting means comprises a manually adjustable knob, said knob being provided with an index, and a scale cooperating with said index, said scale being calibrated linearly with respect to the deflection of said mirror.

12. In a pneumatically operated oscillograph, a large sealed chamber, a small chamber within said large chamber and sealed by a flexible diaphragm, movable indicating means actuated by flexure of said diaphragm, continuously adjustable means manually operable externally of said large chamber for adjusting the degree of movement of said indicating means with respect to the degree of flexure of said diaphragm, a pneumatic conduit interconnecting said chambers, and a manually operable valve in said conduit for controlling the degree of interconnection between said chambers.

13. In a pneumatically operated oscillograph, a large sealed chamber, a small chamber within said large chamber and sealed by a flexible diaphragm, movable light-reflecting means actuated by flexure of said diaphragm, a pneumatic conduit interconnecting said chambers, an external pneumatic connection to said chambers, a valve in said conduit for controlling the degree of interconnection between said chambers, mechanical means for adjusting the degree of movement of said light-reflecting means with respect to the degree of flexure of said diaphragm, and means individual to said valve and to said mechanical means manually operable externally of said large chamber for controlling said valve and said mechanical means, respectively, whereby to adjust the sensitivity of said oscillograph.

14. In a pneumatically operated oscillograph, two sealed chambers, a flexible diaphragm separating said chambers, movable indicating means actuated by flexure of said diaphragm, adjustable means operable externally of said chambers for adjusting the degree of movement of said indicating means with respect to the degree of flexure of said diaphragm, an index and a scale cooperating with said adjustable means, said scale being calibrated in increments which bear a linear relation to the corresponding movement of said indicating means, and pneumatic connections to said chambers.

15. In a pneumatically operated oscillograph, two sealed chambers, a flexible diaphragm separating said chambers, movable indicating means actuated by flexure of said diaphragm, manually adjustable means operable externally of said chambers for adjusting the degree of movement of said indicating means with respect to the degree of flexure of said diaphragm, an index and a scale cooperating with said adjustable means, said scale being calibrated in increments which bear a linear relation to the corresponding movement of said indicating means, a pneumatic conduit interconnecting said chambers, means associated with said conduit manually operable to vary to precise degree the interconnection between said chambers, and an external pneumatic connection to at least one of said chambers.

16. In oscillosphygmographic apparatus, a large sealed chamber, a small chamber sealed by a flexible diaphragm, a source of steady pneumatic pressure, a cuff, pneumatic connections between said source, said cuff and said large chamber, a pneumatic conduit between said chambers, adjusting means associated with said conduit manually operable to vary to precise degree the interconnection between said chambers, optical means actuated by flexure of said diaphragm, a light source arranged to impinge a light beam on said optical means, a camera arranged to receive and record movement of a light beam from said optical means, and continuously adjustable means manually operable externally of said chambers for varying the degree of movement of said optical means with respect to the degree of flexure of said diaphragm.

17. In oscillosphygmographic apparatus, a large sealed chamber, a small chamber sealed by a first flexible diaphragm, a source of steady pneumatic pressure, a cuff, a pneumatic capsule, pneumatic connections between said source, said cuff, said capsule and said large chamber, a manometer connected to indicate pressure in said connections, a pneumatic conduit between said chambers, adjusting means associated with said conduit manually operable to vary to precise degree the interconnection between said chambers, a first mirror actuated by flexure of said first diaphragm, a second diaphragm on said capsule and a second mirror actuated by flexure of said second diaphragm, a light beam source arranged to cause two light beams to impinge on said mirrors, respectively, manual means for initially adjusting the direction of the beam reflected from said second mirror, continuously adjustable means manually operable for varying the degree of movement of said first mirror with respect to the degree of flexure of said first diaphragm, and light receiving means positioned to receive reflected beams from both said mirrors.

18. A combination according to claim 17 in which an index and a scale are provided to cooperate with said continuously adjustable means, said scale being calibrated in increments which bear a linear relation to the corresponding movement of said first mirror.

19. In oscillosphygmographic apparatus, first and second sealed chambers, a flexible first diaphragm separating said chambers, first recording means actuated by movement of said first diaphragm, a pneumatic cuff for detecting pulsations, a pneumatic connection between said cuff and one of said chambers whereby said pulsations actuate said first diaphragm, a third sealed chamber one side of which comprises a second diaphragm considerably less flexible than said first diaphragm whereby said second diaphragm is relatively unaffected by pulsations from said cuff, second recording means actuated by movement of said second diaphragm, a source of steady pneumatic pressure, pneumatic connections including said first-mentioned connection between said source, said cuff and said three chambers, manual control means for adjusting the rate of release of pressure from said source into said cuff and said third chamber, and record means cooperating with said recording means for simultaneously recording the movements of said first and second recording means whereby pulsations from said cuff and pressure in said cuff are separately recorded.

20. In a pneumatically operated oscillograph for indicating minute fluctuations in pressure, a small chamber sealed by a sensitive diaphragm, indicating means actuated by flexure of said diaphragm, a large chamber so positioned as to be separated from said small chamber by said diaphragm whereby the outside of said diaphragm is subjected to the pressure in said large chamber, means impressing on said small chamber and thus on the inside of said diaphragm minute pressure fluctuations to be indicated, a source of fluid pressure, means selectively interconnecting said source and said chambers, means for releasing the fluid pressure in said large chamber, manually adjustable means for controlling the rate of change of pressure in said chambers, and manually adjustable means to compensate the effect of pressure on one side of said diaphragm with respect to that on the other side thereof.

HENRY LAX.